Nov. 18, 1969    J. L. JANNING    3,479,561
BREATH OPERATED DEVICE
Filed Sept. 25, 1967    2 Sheets-Sheet 1
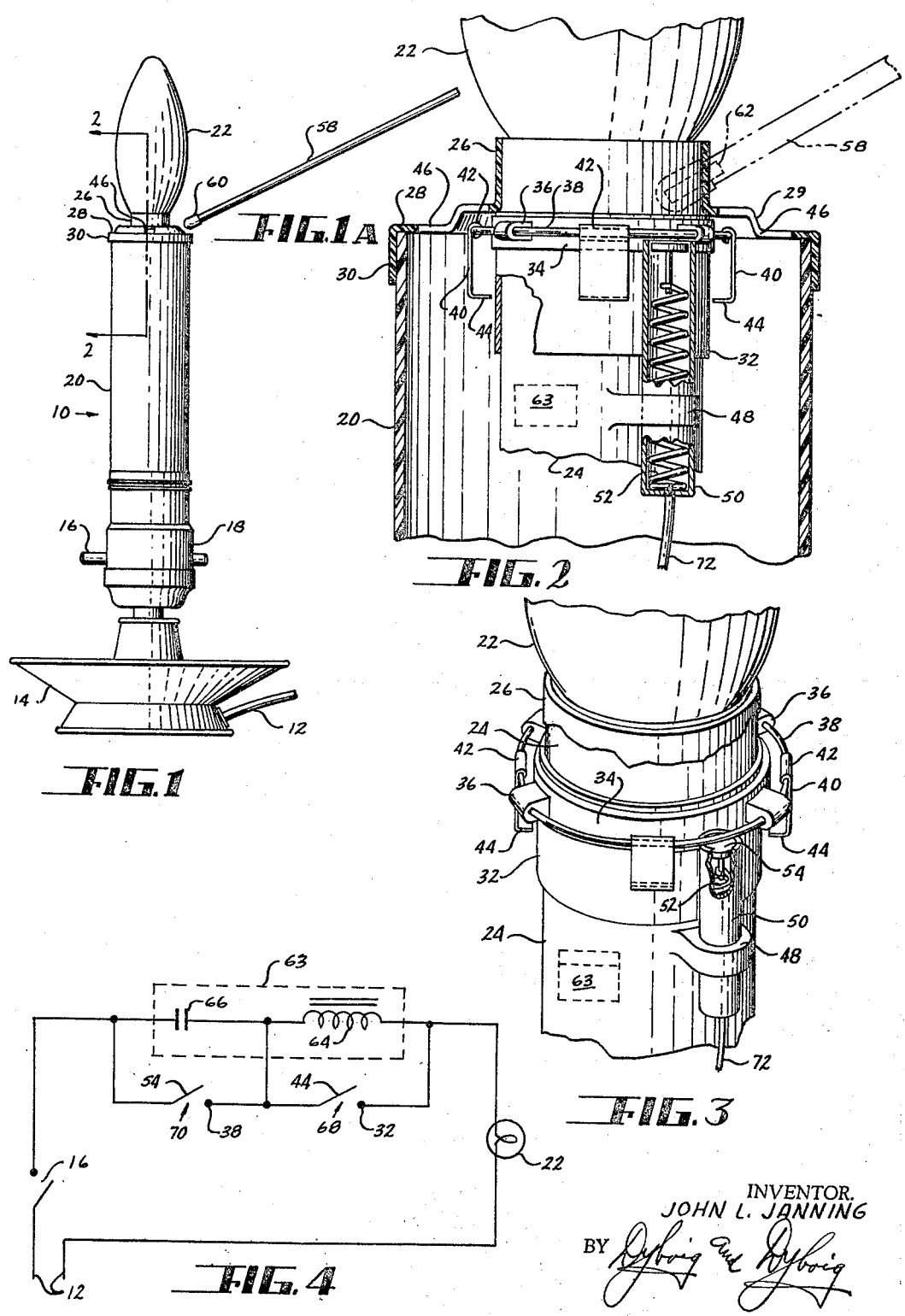

Nov. 18, 1969  J. L. JANNING  3,479,561
BREATH OPERATED DEVICE
Filed Sept. 25, 1967  2 Sheets-Sheet 2
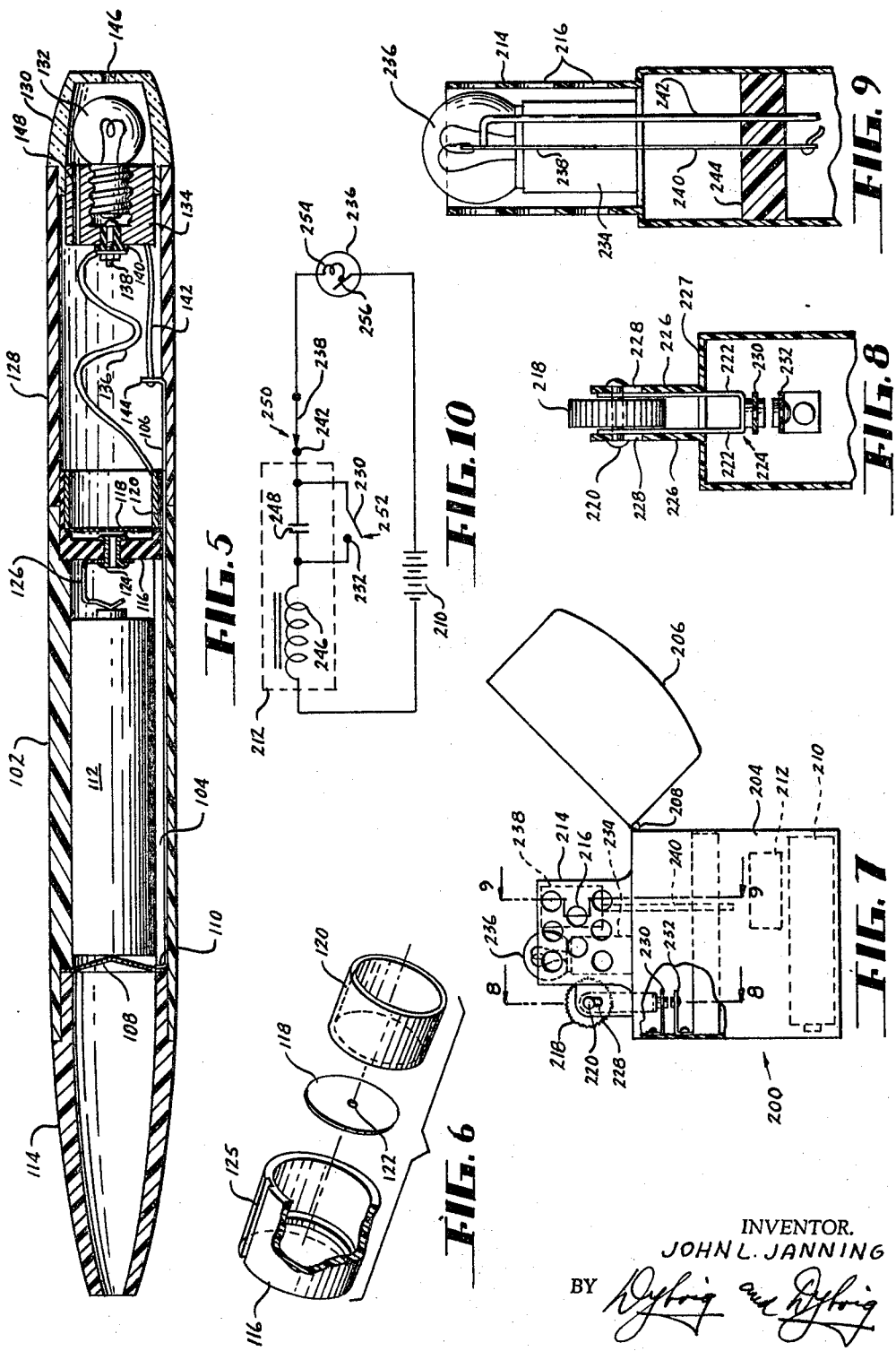
INVENTOR.
JOHN L. JANNING
BY
HIS ATTORNEYS United States Patent Office 3,479,561
Patented Nov. 18, 1969

3,479,561
BREATH OPERATED DEVICE
John L. Janning, Dayton, Ohio, assignor of one-third each to H. Talman Dybvig and Roger S. Dybvig, both of Kettering, Ohio
Filed Sept. 25, 1967, Ser. No. 670,255
Int. Cl. H05b 37/02, 41/36
U.S. Cl. 315—119                                18 Claims

ABSTRACT OF THE DISCLOSURE

An electrical apparatus which simulates a burning element such as a candle, includes a switch that is responsive to an operator's breath. The switch is placed adjacent the simulated burning element and, with associated circuitry, controls the operation of the simulated burning element. The apparatus is so arranged that a breathing activity, such as blowing toward the simulated flame, actuates the breath operated switch. In response, the switch and associated electrical circuitry alter the burning element, giving the illusion that the simulated burning element was directly affected by the operator's breath. Devices given as examples comprise an electric lamp simulating a candle which is extinguished by an operator blowing upon the base of a light bulb; a simulated cigarette lighter having a light bulb representing the flame thereof which is extinguished by blowing toward the light bulb; and a simulated cigar having a lamp at one end thereof to represent burning tobacco which is energized by operator inhalation at the opposite end of the simulated cigar. In simulating flame devices extinguished as by blowing, lamp illumination is sustained by a holding relay and simulated flame extinction is achieved with a breath operated switch which momentarily interrupts the voltage applied to the holding relay. Ignition of simulated flame devices is achieved with a magnet carrier resembling a match and a magnetically sensitive switch which responds when the simulated match is presented to the magnetically sensitive switch.

---

Electric lamps which resemble candles or lanterns are in common usage and, from time to time, flashlight type devices which resemble cigars or cigarettes have appeared on the market. In all such prior devices, the degree of simulation has been limited for the reason that candles, lanterns, cigars, cigarettes and the like are responsive to the user's breath whereas the prior simulated devices respond only to a manually operated electrical switch.

For example, a real candle is extinguished by the user blowing on the flame, but electric lamps simulating candles are typically extinguished by a manually operated switch. In the case of a real cigar or cigarette, light emission from the burning tobacco is enhanced when the smoker inhales. However, in simulated cigars or cigarettes, light control is typically achieved by a somewhat unnatural biting or squeezing action and there is no breath responsiveness.

An object of the present invention is to provide an electrical apparatus responsive to an operator's breath.

Another object of the present invention is to provide a new and improved breath controlled switch.

Another object of the present invention is to provide improved electrical circuitry for use in association with breath controlled switches.

A further object of the present invention is to simulate breath operation of an electrical device by placing a control switch responsive to an operator's breath in proximity to the electrical device.

A still further object of the present invention is to provide flame simulating devices which are breath controlled.

Other objects and advantages will become apparent from the following description.

In the drawings, FIGURE 1 is a side elevational view of a first embodiment of the present invention.

FIGURE 1A is a plan view of a simulated match usable with the first embodiment.

FIGURE 2 is a fragmentary sectional view taken along the line 2—2 of FIGURE 1 with portions broken away, and conductive leads removed, the simulated match of FIGURES 1A is being shown, in phantom detail, in its operating position.

FIGURE 3 is a fragmentary perspective view with portions broken away illustrating an interior assembly employed in the embodiment of FIGURE 1.

FIGURE 4 is a schematic circuit diagram illustrating the electrical connection between the electrical components of the first embodiment.

FIGURE 5 is a longitudinal sectional view of a second embodiment of the present invention.

FIGURE 6 is an exploded and enlarged perspective view with a portion broken away illustrating a subassembly employed in the second embodiment.

FIGURE 7 is a side elevational view of a third embodiment.

FIGURE 8 is a sectional view taken substantially along the line 8—8 of FIGURE 7.

FIGURE 9 is a sectional view taken substantially along the line 9—9 of FIGURE 8.

FIGURE 10 is a schematic circuit diagram illustrating the electrical connection between components of the third embodiment.

FIGURES 1 through 4 of the drawings illustrate the first embodiment of the present invention in which a lamp 10 is employed to simulate a candle. The lamp is of conventional appearance and operates from electrical power supplied through a conductor 12 which enters a base 14 and connects in conventional manner to an off-on switch mounted in a housing 18.

Projecting upwardly from the switch housing 18 is a tubular stem 20. A conventional incandescent bulb 22 projects above the stem 20 as to simulate a candle flame.

Mounted concentrically within the tubular stem 20 is a tubular sleeve 24 which is preferably or a non-conductive material such as plastic. The sleeve 24 is supported by a snugly fitting collar 26 which has an annular radially outwardly extending shoulder 28 seated on the stem 20. Depending downwardly from the shoulder 28 is an annular flange 30 which encircles the stem 20 to center the sleeve 24 concentrically within the stem 20. The sleeve 24 receives and supports a conventional socket, not shown, for the bulb 22.

An electrically conducting ferrule 32 is snugly received on the sleeve 24 just below the collar 26. The ferrule 32 is encircled by a band 34 upon which peripherally spaced mounting brackets 36 are fixed. The mounting brackets 36 are apertured to receive a circular conductor 38. Dangling from the conductor 38 are a plurality of baffle elements 40.

Each of the baffle element 40 has a curved hinge portion 42 encircling the conductor 38 at the upper end thereof and a contact flange 44 projecting at a right angle from the lower end thereof. The contact flanges of the several baffle elements 40 project radially inwardly toward the ferrule 32 but normally do not contact the ferrule 32.

The baffle elements 40 are fabricated of a conductive material and, by contact between the hinge portions 42 and the conductor 38, are electrically connected to the conductor 38. The conductor 38 is electrically insulated from the ferrule 32 by forming the band 34 or the mounting brackets 36, or both, of a non-conducting material such as plastic. Preferably the band 34 and mounting brackets 36 are integrally formed as a molded plastic piece.

In the first embodiment, as illustrated, there are four of the baffle elements 40 located at approximately equal angular intervals around the conductor 38. It will be apparent from the following description, however, that a single baffle element 40 can be used to accomplish the intended function or, in the alternative, any greater number of the baffle elements 40 might be empolyed.

Consonant with the use of four baffle elements 40 as described, the shoulder 28 integral with the collar 26 contains four apertures 46 disposed at equal angular intervals about the collar 26. The apertures 46 are radially aligned with the baffle elements 40 with the result that a gust or current of air directed inwardly through any one of the apertures 46 will act against the baffle aligned with such aperture and cause the baffle to pivot radially inwardly on the conductor 38. A strong gust or current of air will cause the baffle element 40 to pivot a sufficient distance that its contact flange 44 touches the ferrule 32. As an aid in directing air to the baffle elements 40, the shoulder 28 may be offset, as at 29, so that air moving through the apertures 46 will have a radical component. By a proper adjustment of the dimensions of the apertures 46, the mass and surface area of the baffle elements 40, and the separation between the shoulder 28 and the baffle elements 40, these baffle elements are readily pivoted to engage the ferrule 32 with a modest puff of exhaled air.

Fixedly attached to the sleeve 24 is a mounting bracket 48 which supports an elongated cylindrical can 50. The can 50 is open ended and houses a coil spring 52. Secured to the upper end of the spring 52 is a ferromagnetic contact member 54.

The spring 52, when relaxed, supports the contact member 54 directly below the conductor 38 and only a short distance therefrom. The construction is such that positioning of a permanent magnet above the shoulder 28 in approximate axial alignment with the can 50 will cause the contact member 54 to be attracted toward the magnet and to physical contact with the conductor 38. FIGURES 1A and 2 illustrate a simulated match 58 having a tip 60 concealing a permanent magnet 62. By moving the simulated match tip 60 toward the collar 26 in approximate axial alignment with the can 50, the contact 54 is caused to strike the conductor 38.

Housed within the sleeve 24 below the base of the bulb 22 is an electromagnetic relay 63 operated by an inductance coil. The relay 63 is of a conventional type having switch contacts normally biased to an open position, as by a spring, and closed upon energization of the inductance coil.

The schematic circuit diagram of FIGURE 4 illustrates the electrical connection between the various circuit components of the first embodiment. For convenience, the circuit components pictorially illustrated in FIGURES 1 through 3 are given the same numerical designation in FIGURE 4. The previously mentioned relay 63 comprises the inductance coil 64 and the normally open switch 66 of FIGURE 4. In the circuit of FIGURE 4, the coil 64, switch 66, bulb 22 and manual control switch 16 are connected in series across the input conductors 12. The control switch 16 removes power from the circuit by opening one of the conductors 12 and restores power to the circuit by closing the same conductor.

It was explained above that the bulb 22 is received in a conventional socket, not shown, housed in the sleeve 24. As common, the socket has a first terminal which connects electrically to a side wall surrounding the base of the bulb and a second terminal which connects electrically to a contact located centrally in the base of the bulb. With reference to FIGURE 4, the conductor 12 which is opened and closed by the switch 16 connects to one terminal of the bulb socket through the relay 63 while the other conductor 12, passing through the sleeve 24, connects directly to the other terminal of the bulb socket.

The ferrule 32 appears in FIGURE 4 as fixed contact 32 of a normally open switch 68. Conductor means appearing diagrammatically in FIGURE 4, but not illustrated in FIGURES 1 through 3, connect the ferrule 32 to one end of the coil 64.

The movable contact 44 of the switch 68 comprises the flange 44 on any of the baffle elements 40. A conductive path which includes the conductor 38 illustrated in FIGURES 2 and 3 connects the movable switch contact or flange 44, to the opposite end of the coil 64. Thus, pivotal movement of any of the baffle elements 40 against the ferrule 32 will effect closure of the switch 68 illustrated in FIGURE 4. The switch 68 is thus a breath operated switch.

FIGURE 4 illustrates a second normally open switch 70 having a fixed contact 38 which corresponds to the conductor 38 of FIGURES 2 and 3 and a movable contact 54 corresponding to the ferromagnetic contact 54 fixed to the spring 52. A conductor 72, illustrated in FIGURES 2 and 3, connects the movable contact member 54 to one side of the relay switch 66. It will be noted that closure of the switch 70 shunts the normally open relay switch 66. With reference to the circuit diagram of FIGURE 4, the lamp device illustrated in FIGURES 1 through 3 operates as follows. Switch 16 is a master control switch which must be moved to the closed position before the light bulb 22 can be energized. However, mere closure of the switch 16 cannot energize the light bulb 22 due to the presence of the normally open switches 66 and 70.

Bulb 22 is energized by moving the magnet 62 into axial alignment with the contact member 54 as illustrated in FIGURE 2. With the magnet in position, contact member 54 is drawn against conductor 38, closing normally open switch 70. With closure of normally open switch 70, the relay coil 64 and the bulb 22 are placed in series directly across the power supply. This energizes both the bulb 22 and the coil 64.

In response to energization of the coil 64, normally open switch 66 closes. With closure of switch 66, energization of the relay coil 64 is sustained so that the relay coil is capable of holding itself in operation and sustaining energization of the lamp 22. Since the relay coil 64 is thus capable of maintaining its own energization through the switch 66, it requires only a brief movement of the magnet 62 toward the contact member 54 so that the contact member 54 momentarily engages the conductor 38 to accomplish a self sustained energization of the bulb 22.

The bulb 22 can be turned off in either of two ways. One way is to blow toward the base of the bulb 22 such that exhaled air entering any of the apertures 46 acts upon one or more of the baffle elements 40 to cause momentary contact between any of the flanges 44 and the ferrule 32. This effects a momentary closure of the switch 68 which shorts the coil 64 with the result that the magnetic field associated with the coil 64 is momentarily collapsed. The momentary collapse of the magnetic field releases the normally open switch 66 whereupon it returns to its normally open position. Although the switch 68 is only momentarily closed, the resultant opening of the normally open switch 66 open-circuits the coil 64. Therefore, the coil 64 remains de-energizsed until the switch 70 is again closed, as with the magnet 62.

The alternate way to de-energize the bulb 22 is by pushing the switch 16 to the open position which also collapses the field about the coil 64 so as to release the normally open relay switch 66.

In view of the foregoing description it will be apparent that the embodiment of FIGURES 1 through 4 can be used to accurately simulate a candle. Thus, candles are lighted by placing a flame to the wick thereof. The lamp of this first embodiment is energized by presenting a simulated match to the base of the light bulb 22. Candles are extinguished by blowing on the flame. The bulb of this first embodiment is turned off by blowing toward the base of the light bulb.

An important feature of the present invention is the use of a known cause, blowing, to produce a commonly observed effect, light extinction.

To achieve a desired illusion in the present invention, the breath operated switch and the bulb extinguished thereby are both exposed to the operator's breath so that a casual observer will be tempted to conclude that the act of blowing directly affected the light bulb. Whereas, in fact, the act of blowing merely operated a switch that affected the light bulb.

A second embodiment constituting a simulated cigar is illustrated in FIGURES 5 and 6. The simulated cigar has a centrally located body section 102 which is of tubular shape and is counterbored at the opposite ends thereof. The section 102 has an interior groove 104 extending axially between the counterbored ends thereof. The groove 104 receives an axially extending conductor 106.

Positioned at the left end of the section 102, as viewed in FIGURE 5, is a conductive clip 108 which abuts a radial projection 110 on the conductor 106 so as to make electrical contact therewith. The clip 108 is adapted to engage the base of a battery 112 inserted into the section 102. The clip 108 is secured in place by the mouth piece 114 of the simulated cigar which is telescopically received in the left counterbored end of the section 102, as viewed in FIGURE 5.

The right counterbored end of the section 102, as viewed in FIGURE 5, receives an insert 116 which is of non-conductive material. The insert 116 is cup shaped and has a counterbored interior wall receiving a thin metallic diaphragm 118. The diaphragm 118 partitions the insert 116 adjacent the base thereof and is secured in position by a metallic sleeve 120 peripherally engaging the diaphragm 118 and bonded to the inside wall of the insert 116. For reasons which become apparent in the following, the diaphragm 118 may have a central aperture or perforation 122.

The base of the insert 116 has a tubular rivet 124 passing therethrough. The rivet 124 secures a contact member 126 which bears against the positive terminal of the battery 112. The rivet 124 is of a conductive material.

Referring to FIGURES 5 and 6, the outside wall of the insert 116 is routed to provide a longitudinal groove 125 therein. The groove 125 provides clearance for the conductor 106. Telescopically received on the outer end of the insert 116 is a body section 128 which, in cooperation with the body section 102, forms a peripheral air seal about the insert 116.

The body section 128 telescopically receives a plastic end piece 130 which houses a bulb 132. The end piece 130 is preferably translucent and colored to simulate the ash on the end of a burning cigar.

The light bulb 132 is threadedly received in a suitable socket member 134 which is of conductive material. Contact to the base of the bulb 132 is made through a conductive wire 136 which engages a conductor 138 insualted from the base of the socket member 134 by sleeve 140. The conductive wire 136 is soldered or otherwise attached to the sleeve 120 which conductively engages the diaphragm 118.

A conductive wire 142 fixed at one end to a flange 144 formed on the conductor 106 connects to the threaded sidewall of the bulb 132 through the body of socket member 134.

With the construction as shown, the base of battery 112 is electrically connected to the threaded sidewall of light bulb 132 through the clip 108 at the base of the battery, conductor 106, wire 142 and socket member 134. The positive terminal of the battery 112 is prepared for connection to the base of the bulb 132 through contact member 126, rivet 124, diaphragm 118, sleeve 120, conductor wire 136 and conductor 138. However, this circuit is not complete due to the presence of a small air gap between the diaphragm 118 and the rivet 124.

Completion of the described circuit between the light bulb 132 and the battery 112 is achieved by establishing a pressure difference at the opposite faces of the diaphragm 118. To provide for the establishment of this pressure difference, the end piece 130 has one or more perforations 146 therein and the socket member 134 has an axial bore 148 extending therethrough. In addition, the groove 104 in the body section 102 is made deep enough with respect to the radial thickness of the conductor 106 to allow air to pass axially alongside the battery 112. The clip 108 is only a thin resilient strap and does not impede air passage from the base of the battery 112 to the interior of the mouth piece 114. As a result there is a continuous air passage through the interior of the cigar shaped body which is partially interrupted only by the insert 116. The interruption of this air passage by the insert 116 is described as partial for the reason that a restricted amount of air will pass through the perforation 122 in the diaphragm 118 and through the hollow center of the tubular rivet 124.

To operate the simulated cigar a user draws air through the mouth piece 114 as if to draw smoke from a cigar. This causes air to be evacuated from the left side of the diaphragm 118. As a result the pressure to the left of the diaphragm 118 is reduced below that of the ambient atmosphere. On the other hand the pressure to the right of the diaphragm 118 as viewed in FIGURE 5, remains at substantially the level of the ambient atmosphere due to the presence of the perforation 146 in the end piece 130 and the bore 148 in the socket member 134.

The differential pressure thus produced causes the diaphragm 118, which is flexible, to flex toward the tubular rivet 124 and make electrical contact therewith. This completes the electrical circuit with the result that the light bulb 132 glows. The rivet 124 and diaphragm 118 thus constitute a breath operated switch.

The presence of the perforation 122 in the diaphragm 118 permits the user to draw air from the mouth piece 114 and sustain operation of the light bulb for prolonged periods of time. In the absence of the perforation 122 the user would experience an abrupt and unnatural resistance to his attempt to prolong inhalation. By proper adjustment of the size of the perforation 122, a realistic sensation of puffing, as on a cigar, is achieved.

As was true of the first embodiment previously described, the present embodiment produces the illusion that a common cause, inhaling, produces a common effect, lighting the end of a cigar.

FIGURES 7, 8, 9 and 10 illustrate a third embodiment of this invention comprising a simulated cigarette lighter 200. The lighter includes a base member 204 and a cap 206 joined to the top 227 of the base member by means of a hinge 208. The base member houses a battery 210 and a relay 212 which are components of an operating circuit to be described subsequently.

Projecting upwardly from the base member 204 is a simulated windshield 214 having numerous perforations 216 therein. The windshield 214 is of a size that it can be fully received within the hinged cap 206 when the cap has been pivoted to covering relation to the base member 204.

Positioned adjacent the windshield 214 and projecting partially thereinto is a simulated flint wheel 218. The flint wheel 218 has an axle 220 which is journaled for rotation in the parallel legs 222 of a U-shaped bracket 224, best shown in FIGURE 8. The legs 222 fit slidably between spaced guide plates 226 which may be integrally formed with the base member 204 and project upwardly from the top 227 thereof. Each of the guide plates 226 has a vertically elongated slot 228 therein which receives one end of the axle 220.

The U-shaped bracket 224 receives a vertically upward bias from a resilient switch blade 230 fixedly mounted inside the base member 204. The arrangement is such that, in the normal act of spinning the flint wheel 218, the operator will press the U-shaped bracket 224 downwardly against the bias of the blade 230. Positioned directly below the blade 230 is a second switch blade 232, also fixed to the interior of the base member 204. The switch blades 230 and 232 are positioned to make contact when an operator presses downwardly with his thumb to start the simulated flint wheel 218 spinning.

Positioned adjacent the simulated flint wheel 218 and within the windshield 214 is a conventional socket element 234 adapted to receive the base of a light bulb 236. The socket element 234 supports the light bulb partially within the windshield 214 at the typical position of the flame in an actual cigarette lighter.

Positioned adjacent the bulb 236 and within the windshield 214 is a baffle element 238 having a resilient supporting stem 240. As best seen in FIGURE 9, a stationary contact rod 242 is positioned to one side of the baffle 238. The contact rod 242 normally touches the baffle 238 so as to make electrical contact therewith.

The contact rod 242 and the stem 240 supporting the baffle 238 are embedded in spaced relation in a non-conductive supporting wafer 244, fixedly positioned in the interior of the base member 204. The arrangement is such that an operator blowing against the windshield 214 from the right side, as viewed in FIGURE 9, will displace the baffle 238 from the contact rod 242, momentarily breaking electrical contact between the rod 242 and the baffle 238.

An operating circuit suitable for operating the lighter of FIGURES 7, 8 and 9 is illustrated in FIGURE 10. In this circuit the relay 212 is shown as comprising an inductance coil 246 and a normally open switch 248 which responds to energization of the coil 246 by moving to the closed position.

The previously described switch blades 230 and 232 appear in FIGURE 10 as a normally open switch 252, and the previously described contact rod 242, together with the baffle 238, appear as a normally closed switch 250.

As appears in FIGURE 10, conductors, not shown in FIGURES 7, 8 and 9, connect the bulb 236, the switches 248 and 250 and the coil 246 in series relation across the battery 210. The normally open switch 252 is connected directly across the relay switch 248.

Manual operation of the simulated flint wheel 218 so as to close the normally open switch 252 causes the switch 252 to bypass the relay switch 248 so that the relay coil 246 and the bulb 236 are simultaneously energized. The electromagnetic field thus created about the coil 246 closes normally open relay switch 248 so as to sustain operation of the coil 246 as well as the bulb 236. It requires only a momentary operation of the simulated flint wheel 218 to produce this self-sustained energization of the coil 246 and bulb 236.

In the intended operation, the light bulb 236 is extinguished by the act of blowing air against the baffle 238. It requires only a momentary separation between the baffle 238 and the contact rod 242 to collapse the field associated with the inductance coil 246 with the result that the relay switch 248 opens, extinguishing the bulb 236.

Recognizing that children are easily distracted and may occasionally set the simulated lighter aside without extinguishing the bulb 236, it is preferred that the bulb 236 have an internally constructed thermally responsive switch in which a bimetallic element 256 separates from the filament 254 of the bulb after sufficient heat has been generated within the bulb 236. Such thermally responsive devices are commercially available in the form of flasher lights, as frequently employed in Christmas decorations.

Should a child become distracted and fail to operate the breath operated switch 250, as by blowing, the thermal switch will ultimately break the circuit to the relay coil 246 so as to permanently extinguish the bulb 236 until such time as the simulated flint wheel is again operated.

A feature which is common to each of the three embodiments above described is that the breath operated switch is located in proximate relation to a light bulb in such fashion that the act of moving air past the light bulb also operates the breath operated switch. This give an illusion to the casual observer that the act of breathing directly influenced the light bulb. An important factor in creating this illusion is that the apparent influence on the light bulb is immediately detected by the human senses. Thus, if there is a time delay between the act of breathing and the resulting effect on the light bulb, the casual observer will not be induced to conclude that the light bulb responded directly to the operator's breath.

A further and desirable feature of the present invention is that the light bulb, whose operation is controlled by the act of breathing is within the field of vision of the operator. Thus, the same illusion of direct influence on the light bulb is conveyed to the operator.

Preferred embodiments of the invention have been described and it will be understood that various modifications may be made without departing from the scope of the invention defined in the following claims.

Having thus described my invention, I claim:

1. Apparatus comprising: an electrical device effective to stimulate a human sensory mechanism, circuit means to connect said device to a source of power for operating said device, said circuit means including a breath operated switch having a part movable by air, said switch controlling the supply of power to said device and being effective in response to movement of said part to change the supply of power to said device, and body means supporting said part and said device in proximate relation for substantially simultaneous contact with air moved by breathing.

2. The apparatus of claim 1 in which said body means includes a housing portion receiving said part, said housing portion having an aperture to pass air moved by breathing to said part.

3. The apparatus of claim 2 in which said housing portion simulates a candle and said electrical device simulates the flame of said candle.

4. The apparatus of claim 2 in which said body means simulates a cigarette lighter and said electrical device is a light bulb to simulate the flame of said cigarette lighter.

5. The apparatus of claim 4 in which said housing portion simulates a windshield for the flame of a cigarette lighter, and said light bulb is disposed in said windshield adjacent said part.

6. The apparatus of claim 1 in which said switch has one contact element fixedly supported by said body means and said part comprises a second contact element movably supported by said body means, said part having a surface portion to react with air moved by breathing.

7. The apparatus of claim 6 in which said body means is an elongated tubular housing having a mouth piece at one end thereof through which air can be drawn from the opposite end of said housing, said part comprising a flexible diaphram disposed within said housing transverse to the longitudinal axis thereof, said diaphram being movable axially in said housing by flexure thereof, said one contact element being disposed between said diaphram and said mouth piece and spaced from said diaphram, said diaphram being so constructed and arranged that inhalation from said mouth piece will move said diaphram to touch said one contact element.

8. The apparatus of claim 7 in which said electrical device is an incandescent lamp disposed within said housing adjacent said opposite end, said diaphram and said one contact element, upon touching thereof, completing said circuit means to connect said incandescent lamp to said source of power.

9. The apparatus of claim 8 in which means peripherally engaging said diaphram cooperate with said housing to partition said housing transversely of said longitudinal axis, said diaphram having a perforation therethrough.

10. The apparatus of claim 8 in which said housing simulates a cigar.

11. The apparatus of claim 1 in which said circuit means includes an inductance coil and a normally open relay switch responsive to said coil, said coil and relay switch being connected in series with said device and said source of power, said coil holding said relay switch closed when energized, said breath operated switch controlling the supply of power to said device by controlling the supply of power to said coil.

12. The apparatus of claim 11 in which said breath operated switch has a first contact element fixedly supported by said body means and said part comprises a second contact element movably supported by said body means, said first and second contact elements being connected respectively to opposite ends of said coil, said contact elements being normally separated but shunting said coil upon movement of said second contact by air to engage said first contact.

13. The apparatus of claim 11 in which conductor means connect said breath operated switch, said coil, said relay switch, and said electrical device in series relation across said source of power, said breath operated switch being a normally closed switch, said part, upon movement thereof by air opening said breath operated switch to interrupt the supply of power to said device and to said coil and thereby release said relay switch.

14. The apparatus of claim 13 in which said circuit means includes a normally open manual switch connected across said relay switch, and said apparatus includes manually operable means supported by said body means to close said manual switch.

15. The apparatus of claim 14 in which said body means simulates a cigarette lighter and said manually operable means simulates a flint wheel.

16. The apparatus of claim 11 in which one end of said inductance coil is electrically connected to one contact of said relay switch, said body means having a conductive ring supported therein, said conductive ring being electrically connected to said one end of said coil and to said one contact of said relay switch, said part of said breath operated switch comprising a conductive baffle member pivotally mounted on said conductive ring and electrically connected thereto, said breath operated switch also comprising contact means supported within said body in normally spaced relation to said baffle member and electrically connected to the opposite end of said relay coil, said circuit means including a magnetizable member spaced from said conductive ring, said magnetizable member being connected electrically with another contact of said relay switch, said magnetizable member adapted to be moved by magnet means to engage said conductive ring to shunt said relay switch, said baffle member being movable by breathing thereagainst to engage said contact means to shunt said coil.

17. Apparatus operable by a gust of air comprising: an electrical device effective to stimulate a human sensory mechanism, circuit means to connect said device to a source of voltage for operating said device, said circuit means including a switch having a contact member movable by air, said switch controlling the supply of voltage to said device, and body means supporting said switch for positioning said movable contact member in the path of a gust of air, said body means supporting said electrical device in proximate relation to said movable contact member, the apparatus being so constructed and arranged that positioning of said movable contact member in the path of a gust of air positions said electrical device in said path of a gust of air.

18. The apparatus of claim 17 in which said contact member is movable by a gust of air produced by the breathing of a human being and said electrical device is a light bulb, said apparatus being so constructed and arranged that positioning of said movable contact member for operation by the breath of a human being presents said light bulb to the field of vision of said human being.

References Cited

UNITED STATES PATENTS 3,340,647   9/1967   Lathrop _____ 46—228

JOHN W. HUCKERT, Primary Examiner

R. F. POLISSACK, Assistant Examiner

U.S. Cl. X.R.

46—226, 228; 200—81, 81.9; 240—10.64; 315—120, 127, 200, 362; 340—241, 283